United States Patent
Harvey et al.

(10) Patent No.: US 6,855,788 B2
(45) Date of Patent: Feb. 15, 2005

(54) COPOLYMER OF ETHYLENE OXIDE AND AT LEAST ONE SUBSTITUTED OXIRANE CARRYING A CROSS-LINKABLE FUNCTION, PROCESS FOR PREPARATION THEREOF, AND USE THEREOF FOR PRODUCING IONICALLY CONDUCTIVE MATERIALS

(75) Inventors: Paul-Etienne Harvey, St. Hubert (CA); Jean-Yves Sanchez, Saint-Ismier (FR); Fannie Alloin, Grenoble (FR)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 10/307,519

(22) Filed: Dec. 2, 2002

(65) Prior Publication Data

US 2004/0024174 A1 Feb. 5, 2004

Related U.S. Application Data

(63) Continuation of application No. 08/824,329, filed on Mar. 26, 1997, now abandoned, and a continuation-in-part of application No. 08/350,029, filed on Nov. 29, 1994, now abandoned.

(30) Foreign Application Priority Data

Dec. 9, 1993 (CA) .............................................. 2111047

(51) Int. Cl.[7] ............................................. C08F 24/00
(52) U.S. Cl. ..................... 526/273; 528/393; 528/421; 429/317
(58) Field of Search ................................. 526/273, 393, 526/421; 429/317

(56) References Cited

U.S. PATENT DOCUMENTS 5,086,351 A * 2/1992 Couput et al. ............... 359/265
2004/0038132 A1 * 2/2004 Harvey et al. .............. 429/317

* cited by examiner

Primary Examiner—William K. Cheung
(74) Attorney, Agent, or Firm—Oblon, Spivak, McClelland, Maier & Neustadt, P.C.

(57) ABSTRACT

The invention concerns a copolymer of ethylene oxide and at least one substituted oxirane carrying a cross-linkable function. The copolymer comprises ethylene oxide, —O—CH$_2$—CHR— units in which R is a substituent containing a reactive function which is cross-linkable by free radical process, and possibly —O—CH$_2$—CHR'— units in which R' is a substituent containing no reactive function which is cross-linkable by means of a free radical process, It is characterized by an excellent polydispersity index I=M$_w$/Mn and a random distribution of the different monomer units. The copolymer is prepared by an anionic copolymerization process. The copolymer is useful for preparing a solid electrolyte having good mechanical properties, a good cationic conductivity and a good chemical compatibility with the electrodes of a generator operating with alkali metals such as lithium and sodium.

12 Claims, 2 Drawing Sheets

COPOLYMER OF ETHYLENE OXIDE AND AT LEAST ONE SUBSTITUTED OXIRANE CARRYING A CROSS-LINKABLE FUNCTION, PROCESS FOR PREPARATION THEREOF, AND USE THEREOF FOR PRODUCING IONICALLY CONDUCTIVE MATERIALS

CROSS-REFERENCE

This application is a continuation-in-part of U.S. application Ser. No. 08/350,029 filed Nov. 29, 1994 now abandoned.

BACKGROUND OF INVENTION a) Field of the Invention

The present invention concerns a copolymer of ethylene oxide and at least one substituted oxirane carrying a cross-linkable function, a process for the preparation thereof and the use thereof for producing a solid electrolyte having good mechanical properties, a good cationic conductivity and a good chemical compatibility with the electrodes of a generator which operates with alkali metals, such as lithium and sodium.

b) Description of Prior Art

Solvating polymers are known to be useful for preparing ionically conductive materials. Polymers of ethylene oxide or of dioxolane are polymers which solvate cations, in particular alkali cations such as for example the ion $Li^+$ which is present in rechargeable electrochemical generators of the polymer electrolyte lithium battery type. However, these polymers are semi-crystalline, since crystallinity varies as a function of the molecular weight of the polymer. This semi-crystalline character of the polymers results in a decrease of the conductivity of the materials in which the polymers are present.

It has been found that it was possible to decrease the crystallinity of semi-crystalline polymers, without affecting their solvating properties and their electrochemical stability, by introducing defects in the macromolecular chain at possibly irregular intervals. However, it has been observed that the introduction in a semi-crystalline polymer, such as for example a high molecular weight, polyoxyethylene (POE), of units producing disparities, i.e. substituting a semi-crystalline polymer with a copolymer or a polycondensate, is frequently accompanied by a decrease of the molecular weights and a lowering of the mechanical properties, for example at high temperature. An attempt was made to overcome this disadvantage by introducing into the polymer, units which contribute to the formation of tri-dimensional networks by cross-linking the copolymer, before or after its formation. Because of the restraints imposed by the requirements of electrochemical stability, the particularly preferred units permitting cross-linking are selected among those which contain an unsaturated carbon/carbon bond, such as an allyl bond or a vinyl bond. The introduction of such units into a copolymer, additionally makes it possible to fix various groups, for example ionic groups, on the macromolecular chain.

Using an initiator based on organometallic derivatives of non-alkali and non-alkali-earth metals, for example an alkyl aluminum or an alkyl zinc, it is possible to prepare copolymers of an ethylene oxide and of an oxirane which carries an unsaturated substituent by coordination polymerization. See, for example, E. J. Vandenberg, Journal of Polymer Science, Part A-1, Vol. 7, pages 525–567 (1969).

This type of polymerization is not affected by the presence of a small amount of impurities. However, the reactivity of the various comonomers depends on their steric hindrance. Thus, in the production of a copolymer of ethylene oxide and an oxirane carrying a saturated substituent (for example propylene oxide) or an oxirane carrying an unsaturated substituent (for example allyl glycidyl ether), the polymerization yield of ethylene oxide is near 100%, while the yield of the substituted oxirane in a copolymer having a molecular weight higher than 1000 is only 60%. In addition, ethylene oxide is consumed preferably at the start of the polymerization. Because of the difference of reactivity of the monomers, the copolymer formed at the start of the polymerization contains an excess of ethylene oxide and has a higher molecular weight than the one formed during or towards the end of the polymerization reaction. The copolymer formed by coordination polymerization thus has long poly(oxyethylene) sequences which are crystalline and wherein the molecular weights of these sequences are highly heterogeneous.

It is also possible to polymerize saturated oxiranes such as ethylene oxide or propylene oxide through an anionic process. When such a polymerization is carried out with initiators of the sodium hydroxide or potassium hydroxide type in an aqueous solution or in protic solvents such as ethylene glycol, a number of transfer reactions towards the solvent take place, and the molecular weights obtained are very low. When the anionic polymerization of oxiranes is carried out in the presence of initiators of the potassium alcoholate or cesium alcoholate type in an aprotic solvent which solvates cations, or in the presence of complexing agents such as crown-ethers, ethylene oxide undergoes a living polymerization, i.e. the number average degree of polymerization (DPn) increases with the conversion rate, the distribution of molecular weights is narrow, the polydispersity I=Mw/Mn is near 1 and there is practically no transfer and termination reactions. An anionic polymerization which is carried out under these conditions enables one to obtain high molecular weights when the polymer is ethylene oxide. However, when used with monomers of the substituted oxirane type, it has only been possible to obtain low molecular weights ($M_w$<20,000) to this date. For example, the polymerization of styrene oxide initiated with potassium tert-butanolate gives a poly(oxystyrene) having a molar weight of 1000 g, and the growth of the poly(oxypropylene) chains is interrupted by transfer reactions towards the monomer [D-M Simons and J. J. Verbane, J. Polym. Sc. 1960, 44, 303]. When the monomer is phenyl glycidyl ether, chain growth is also rapidly interrupted by transfer towards the monomer [C. C. Price, Y. Atarachi, R. Yamamoto, J. Poly. Sci. PartAl, 1969, 7, 569]. In spite of the advantages associated with nearly quantitative conversion rates in the case of anionic polymerizations, the prior art shows a living character of the polymerization for ethylene oxide only.

The anionic polymerization of cyclic ethers such as ethylene oxide and its substituted derivatives (propylene oxide, butylene oxide, allyl glycidyl ether, etc.) requires a very low level of impurities such as water alcohol, etc. Copolymerizatiohn is slow relative to the homopolymerization of ethylene oxide, and requires therefore a much smaller amount of impurities in order to avoid the chain transfers and chain terminations which yield a low molecular weight copolymer (Mw less than 20,000 for example). To obtain a high molecular weight copolymer (Mw larger than 50,000, for example), one normally requires drastic purification techniques, such as drying and distillation on a vacuum line. Such extreme purification methods are suitable for the preparation of small amounts (1 to 20 g) of model compounds, but would be too expensive for the production of industrial quantities (over 100 kg).

A review of the prior art indicates that an electrolyte may consist of a copolymer of ethylene oxide, methyl glycidyl ether and a small amount of allyl glycidyl ether, the copolymer of course including an ionizable salt, all as disclosed in Couput U.S. Pat. No. 5,086,351. Similar copolymers are also disclosed in U.S. Pat. No. 5,206,756 (Cheshire); U.S. Pat. No. 4,578,326 (Armand); U.S. Pat. No. 5,350,646 (Armand); and French Patent 2 570 224. However, these copolymers have all been prepared by coordination copolymerization and thus have defective mechanical properties, as mentioned above. For example, a simple calculation with respect to the copolymer described by Cheshire in U.S. Pat. No. 5,206,756, column 25, will show that its polydispersity is 95. The other copolymers of the prior art, produced by coordination polymerization, all possess polydispersisty values which are higher than desirable to produce electrolytes with excellent mechanical properties.

The present invention aims at providing a copolymer of ethylene oxide and of at least one substituted oxirane carrying a cross-linkable reactive function, by a free radical process, which gives an ionically conductive material of improved mechanical properties as compared to the materials obtained from known copolymers of the poly (oxyalkylene) type, without decreasing the ionic conductivity by providing too many cross-linking points which would cause an increase of the glass transition temperature Tg, said ionically conductive material additionally showing an excellent chemical compatibility with the electrodes of a generator when the material is used as an electrolyte.

SUMMARY OF INVENTION

It is consequently an object of the present invention to provide a copolymer having a chain comprising ethylene oxide units, —O—$CH_2$—CHR— units in which R is a substituent having a reactive function which is cross-linkable by a free radical process, wherein R may be different from one unit to the other, and possibly —O—$CH_2$—CHR'— units in which R' is a substituent having no reactive function which is cross-linkable by free radical process, wherein R' may be different from one unit to the other. The copolymer according to the present invention is characterized in that the copolymer has a polydispersity Mw/Mn which is lower than or equal to 2.2, and a random distribution of monomer units, the copolymer being prepared by anionic copolymerization in an aprotic solvent and in the presence of an anionic polymerization initiator, and wherein the monomers and solvent used have a water and impurity content lower than or equal to 100 ppm.

Among the copolymers of the present invention, those which have a weight average molecular weight Mw higher than or equal to 20,000, more specially those which have Mw higher or equal to 100,000, are particularly interesting.

The copolymers of the present invention in general have a polydispersity which is between 1.5 and 2.2.

The different units are distributed at random in the chain of a copolymer of the present invention, however, sequences constituted by the chain of a same monomer unit are more regular than in copolymers obtained by known processes, i.e. by coordination polymerization. It is therefore relatively easy to foresee the length of the sequences, which depends only on the relative proportion of the monomers. The random distribution of the monomer units is an important characteristic when the copolymer obtained is subjected to grafting in order to fix an ionic group on the reactive function of the substituents R of the oxirane unit. A random distribution of the ionic groups is essential in order to prevent the formation of privileged passageways for the ions, when the copolymer is used as an ionically conductive material.

DESCRIPTION OF PREFERRED EMBODIMENTS

In the —O—$CH_2$—CHR— units of a copolymer according to the present invention, the reactive function which is cross-linkable by free radical process and which is present in the radical R, is advantageously an unsaturated carbon/carbon bond. The radical R may in this case be selected for example from those having the formula $CH_2$=CH—$(CH_2)_q$—(O—$CH_2)_p$, in which $1 \leq q \leq 6$ (q=1 to 6) and p=0 or 1, or those having the formula $CH_3$—$(CH_2)_y$—CH=CH—$(CH_2)_x$—$(OCH_2)_p$, in which $0 \leq x+y \leq 5$ (x+y=0 to 5) and p=0 or 1. In the same macromolecular chain, it is possible that the unsaturated substituents R are not all identical. In this description the sign $\leq$ means smaller or equal to.

In the —O—$CH_2$—CHR'— units of a copolymer of the present invention, the substituent R' having no reactive function which is cross-linkable by free radical process may be selected from alkyl radicals, preferably from those having 1 to 16 carbon atoms, more preferably those having 1 to 8 carbon atoms.

The substituent R' may additionally be selected alkoxy radicals such as the radicals —$(CH_2)_n$—O—$((CH_2)_m$—O$)_p$—$CH_3$, in which $0 \leq n \leq 4$, $1 \leq m \leq 4$ and $0 \leq p \leq 20$; preferably n=1, m=2 and $0 \leq p \leq 8$. The substituent R' may also be selected from the alkyl(perfluoroalkyl sulfonate) ether radicals; some examples are the radicals having the formula —$CH_2$—O—$(CF_2)_q$—$CF(C_rF_{2r+1})$—$SO_3M$, in which M represents a cation of an alkali metal, $0 \leq q \leq 4$, preferably q=0 or 1, and $0 \leq r \leq 4$, preferably $0 \leq r \leq 3$; among the preferred radicals of this category, radicals —$CH_2$—O—$CF_2$—$CF(CF_3)$—$SO_3M$ and —$CH_2$—O—$CF_2$—$SO_3M$ may be mentioned. The substituent R' may also be selected among radicals including an ionophoric function in which the negative charge is carried by the bis(trifluoromethylsulfonyl) methylide —$C(SO_2CF_3)_2M"$ carbanion; examples of these radicals are —$CH_2$—$C(SO_2$—$CF_3)_2M"$ and —$(CH_2)_s$—$SO_2$—$C(SO_2$—$CF_3)_2M"$, in which $1 \leq s \leq 16$, preferably $0 \leq s \leq 8$, M" represents a metallic cation, more particularly a monovalent cation such as a cation of an alkali metal. The radicals —$CH_2$—$C(SO_2$—$CF_3)_2M"$ and —$(CH_2)_s$—$SO_2$—$C(SO_2$—$CF_3)_2M"$ are particularly preferred.

In a same macromolecular chain, the substituents R' may be not all identical.

The copolymers of the present invention which have a high weight average molecular Mw, i.e., at least equal to 20,000, preferably at least equal to 100,000, are doubly interesting. On the one hand, these copolymers have, in non cross-linked state, intrinsic mechanical properties superior to the copolymers of the same type, of the prior art: they may be prepared and handled in the form of thin films before cross-linking; they may additionally be used as elastomeric bond or as an adhesive when assembling components of a generator. If cross-linking is necessary, less cross-linkable functions may be used. On the other hand, a high molecular weight enables one to use lower quantities of polymerization initiator, and limits the number of terminal reactive alcoholate or hydroxyl functions. In the copolymers of the present invention having a molecular weight of at least 20,000, there is consequently a double limitation of the concentration and mobility of the reactive chemical groups (terminal functions, polymerization initiators, cross-linkable functions which are reactive towards alkali metals, low molecular weight polymers capable of diffusing into the electrodes) which presents a major interest when a copolymer according to the present invention is used as an ionically conductive material, for example in an electrochemical generator operating with alkali metals. In this case, the ionic conductivity of an ionically conductive material comprising the copolymer is not substantially reduced by cross-linking, because the low rate of cross-linking has a negligible effect on the glass transition temperature Tg. In addition, the electrochemical compatibility of the ionically conductive material, when used as electrolyte, with the electrodes of a generator is clearly superior.

In a particular embodiment, a copolymer according to the present invention contains at least 70 mole % of oxyethylene units, about 2 to about 30 mole % of saturated units —O—$CH_2$—$CHR'$—, and about 0.05 to about 10 mole % of —O—$CH_2$—CHR— units containing functions which are cross-linkable by free radical process.

The copolymers of the present invention are obtained by anionic copolymerization, and it is also an object of the invention to provide a process for the preparation of said copolymers.

The process for the preparation of a copolymer according to the present invention consists in reacting ethylene oxide and one or more substituted oxiranes, of which one at least carries a substituent R containing a function which is cross-linkable by a free radical process, in an aprotic solvent in the presence of an anionic polymerization initiator, the monomers and the solvent used having a water and impurity content lower than or equal to 100 ppm, the reactor used for the polymerization reaction being free of traces of humidity and impurities.

In the description which follows, an oxirane carrying a substituent containing a function which is cross-linkable by free radical process will be designated by the term "unsaturated oxirane"; an oxirane having a substituent containing no cross-linkable function will be designated by the term "saturated oxirane".

The polymerization initiator is preferably selected from alkali metals, used in metallic form, in the form of an alcoholate or as a complex for example with a crown-ether. The alkali metal is preferably selected from cesium and potassium. Potassium alcoholates are particularly preferred.

When the initiator is an alkali metal or an alcoholate of an alkali metal, the aprotic solvent in which the polymerization is carried out is selected from the group comprising polar solvents. By way of examples of polar solvents, one may mention THF, dimethoxyethane and dimethylsulfoxide. However, in view of the fact that ethylene oxide and the monomers of the oxirane type are polar, a non-polar solvent may also be used, for example toluene.

When the initiator is used with a complexing agent such as for example a crown-ether, the aprotic solvent may be a polar solvent or a non polar solvent such as toluene.

The process of the present invention is carried out with at least one unsaturated oxirane. Among appropriate unsaturated oxiranes, oxiranes having the formula $CH_2$—CHR—O in which R is as defined above, may be mentioned. Allyl glycidyl ether and epoxyhexene are particularly preferred unsaturated oxiranes.

The function of the units derived from unsaturated oxiranes is to permit, either a cross-linking of the copolymer after the latter has been obtained, or grafting reactions on the substituent, for example in order to fix ionic groups on the macromolecular chain.

The small amount of impurities in the monomers and in the solvent used for the polymerization may be obtained by treating the monomers and the solvent with molecular sieves, or by distillation or filtration in the case of ethylene oxide.

The preliminary treatment of the reactor in order to remove impurities therefrom may be carried out for example by washing the reactor with a solution containing an initiator, and by removing the initiator solution before the introduction of the reagents.

When carrying out the process of the invention, the reaction mixture contains very little impurities which would cause chain terminations. The reaction yield is therefore very high, and may reach values near 100%. The copolymer obtained thus contains a quantity of residual monomer which is sufficiently low to make its removal unnecessary. This is an important advantage when monomers having a high boiling point (for example higher than 150° C.) are used.

The process according to the invention may also be used for copolymerizing ethylene oxide with at least one unsaturated oxirane and at least one saturated oxirane. The introduction of a saturated oxirane in the copolymer enables one to reduce, and even to remove the crystallinity of the copolymer, and to modify its mechanical properties. Among the saturated oxiranes, those corresponding to the formula $CH_2$—$CHR'$—O, in which R' is as defined above, may be mentioned.

When a copolymer of the present invention is intended to be used for preparing an ionically conductive material, it may be useful to deactivate the terminal reactive functions of the macromolecular chains, although the latter may not be numerous because of the high molecular weights.

The terminal functions are in general alcoholate (OH) functions which are very reactive towards a lithium electrode and which contribute to the degradation of the polymer electrolyte/lithium electrode interface. The process of the invention may thus advantageously include an additional step in which the terminal functions are deactivated.

This deactivation may be carried out by means of 2-bromo-1-cyano-ethane, according to the following reaction scheme:

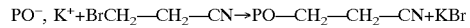

where $PO^-$, $K^+$ represent the non deactivated copolymer.

Deactivation of the terminal functions may also be carried out by means of methyl iodide or methyl sulfate. In this case, the copolymers have methoxy terminal groups and there is respectively formed potassium iodide or sulfate, if the terminal function to be disactivated is a potassium alcoholate.

The properties of the copolymers of the present invention make them particularly useful for preparing materials having ionic conduction. The high molecular weight has a favorable effect on the mechanical properties on the one hand and on the electrochemical properties on the other hand, as previously indicated. In addition, the random distribution of the unsaturated functions enables one to obtain a homogeneous cross-linking when these functions are used for cross-linking. If these functions are used for grafting ionic groups on the copolymer, the statistical distribution of the grafted ionic groups prevents the formation of privileged passageways for the ions.

In order to prepare an ionically conductive material, copolymers which contain at least 70 mole % of ethylene oxide units, about 2 to about 30 mole % of units derived from at least 1 saturated oxirane and about 0.05 to about 10 mole % of units derived from at least one unsaturated oxirane may be used. When the material is used without solvent or with little solvent (less than 10 weight %), the content of units derived from an unsaturated oxirane is preferably between 0.05 and 1 mole %. When the material is swollen by a solvent, the content of units derived from an unsaturated oxirane may reach up to 10 mole %. When the units derived from an unsaturated oxirane are intended to be used for grafting an ionic group on the copolymer, their content is preferably between 3 and 5 mole %.

According to one embodiment, an ionically conductive material according to the present invention essentially comprises one ionic compound which is easily dissociable while in solution in a copolymer according to the present invention. The ionic compound which is introduced into the copolymer before cross-linking or into the cross-linked polymer is selected from ionic compounds which are normally used for ionically conductive solid polymer materials. By way of example, one may mention ionic compounds $A^{a+y-}{}_a$ in which $A^{a+}$ represents a proton, a metallic cation, an organic cation of the ammonium, amidinium or guanidinium type, a being the valency of the cation $A^{a+}$; $Y^-$ represents an anion with delocalized electronic charge, for example $Br^-$, $ClO_4^-$, $AsF_6^-$, $R_fSO_3^-$, $(R_fSO_2)_2N^-$, $(R_fSO_2)_3C^-$, $C_6H(6-x)$ $(CO(CF_3SO_2)_2C^-)_x$ or $C_6H(6-x)$ $(SO_2(CF_3SO_2)_2C^-)_x$, wherein $R_f$ represents a perfluoroalkyl or perfluoroaryl group, in which $1 \leq x \leq 4$. The preferred ionic compounds are lithium salts, more particularly $(CF_3SO_2)_2N^-Li^+$, $CF_3SO_3^-Li^+$, the compounds $C_6H_{(6x)}$—[CO$(CF_3SO_2)_2C^-Li^+]_x$, in which x is between 1 and 4, preferably x=1 or 2, the compounds $C_6H_{(6x)}$—[SO$_2(CF_3SO_2)_2C^-Li^+]_x$, in which x is between 1 and 4, preferably x=1 or 2. Mixtures of these salts with one another or with other salts may be used. By way of examples of mixtures of salts, one may mention: $(CF_3SO_2)_2N^-Li^+$ and $CF_3SO_3^-Li^+$ or $(CF_3SO_2)_2N^-Li^+$ and $C_6H_4$—[CO$(CF_3SO_2)_2C^-Li^+]_2$ in various proportions, but preferably comprising 20 to 40 weight % of $(CF_3SO_2)_2N^-Li^+$. The ionic compound may be incorporated into the copolymer by immersing the copolymer, possibly in the form of a film, into a solution of the selected ionic compound in a solvent, the solvent being thereafter evaporated. According to a variant, the ionic compound may be incorporated into the copolymer by preparing a film from a solution comprising both the copolymer and the ionic compound.

According to another embodiment, an ionically conductive material according to the present invention essentially consists of a copolymer according to the present invention in which an ionic compound containing an unsaturation has been grafted on the radicals R by co-cross-linking with the units —CH$_2$—CHR—O—. In this case, a copolymer according to the present invention comprising about 3 to about 5 molar % —CH$_2$—CHR—O— units is preferably used. Among suitable ionic compounds which may be grafted onto the radicals R, one may use derivatives of perhalogenated sultones carrying an ionic group described in WO93/16988, for example compounds of the type CH$_2$=CH—CH$_2$—(CF$_2$)$_2$—SO$_3$M', CH$_2$=CH—CH$_2$—O—CF(C$_y$F$_{2y+1}$)—CF$_2$SO$_3$M' and CH$_2$=CH—CF(C$_y$F$_{2y+1}$)—CF$_2$SO$_3$M', in which $0 \leq y \leq 4$, preferably $1 \leq y \leq 3$, M' represents a proton, a metallic cation, more particularly a cation of a monovalent metal, or an organic cation. Among the metallic cations, those of an alkali metal are particularly preferred. Among the organic cations, one may mention ammonium cations, guanidinium cations and amidinium cations, said organic cations being possibly quarternized. One may also mention salts of bis (trifluoromethylsulfonyl)-methylide such as [CH$_2$=C(CH$_3$)—CO—C(SO$_2$—CF$_3$)$_2$]$^-$Li$^+$, [CH$_2$=C(CH$_3$)—C(SO$_2$—CF$_3$)$_2$]$^-$Li$^+$, [CH$_2$=CH—CH$_2$—CO—C(SO$_2$—CF$_3$)$_2$]$^-$Li$^+$, [CH$_2$=CH—C$_6$H$_4$—SO$_2$—C(SO$_2$—CF$_3$)$_2$]$^-$Li$^+$, [CH$_2$=CH—CH$_2$—SO$_2$—C(SO$_2$—CF$_3$)$_2$]$^-$Li$^+$, [CH$_2$=CH—SO$_2$—C(SO$_2$—CF$_3$)$_2$]$^-$Li$^+$, [CH$_2$=CH—C$_6$H$_4$—CO—C(SO$_2$—CF$_3$)$_2$]$^-$Li$^+$.

According to yet another embodiment, an ionically conductive material may essentially consist of a copolymer according to the present invention containing —CH$_2$—CHR'—O— units in which the radical R' includes ionic groups. The ionic groups may be selected from the group comprising bis(trifluoro-methylsulfonyl)methylide —C(SO$_2$CF$_3$)$_2$M" in which M" is a metallic cation, preferably an alkali, or perfluorosulfonyl groups of the type —CH$_2$—O—(CF$_2$)$_q$—CF(C$_r$F$_{2r+1}$)—SO$_3$M, where M represents a monovalent metal. The units —CH$_2$—CHR'—O— then fulfill two functions. On the one hand, they decrease the regularity of the solvating macromolecular chain, and consequently its crystallinity; on the other hand, they confer to the copolymer a cationic unipolar ionic conductor character.

The different means described above for introducing ionic species into a copolymer according to the invention for the preparation of a ionically conductive material may of course be combined if desired.

Various additives may be added to the material of the present invention, in order to modify the properties of the final material. Thus, one may incorporate a plasticizing agent such as ethylene carbonate, propylene carbonate, γ-butyrolactone, dimethylformamide, N-methylpyrrolidone, tetraalkylsulfamides, methyl ethers of polyethylene glycols having molecular weights between 200 and 2000 and, generally, derivatives of polar molecules having a low volatility. The proportion of these additives may be up to 1 to 90% of the total weight.

The ionically conductive materials of the invention, consisting of a copolymer and an ionic compound, or of a copolymer carrying ionic substituents, can be used as solid polymer electrolyte to separate electrodes and/or as a component of a composite electrode, especially when the copolymer has a molecular weight at least equal to 20,000. It is consequently an object of the invention to provide an electrochemical cell in which the electrolyte comprises an ionically conductive material according to the present invention, and/or in which one at least of the electrodes is a composite electrode comprising such a material. In a particular embodiment, the electrolyte is a membrane which separates the electrodes, the membrane consisting of an ionically conductive material according to the present invention, which is plasticized by the addition of a suitable solvent, for example a mixture of ethylene carbonate/propylene carbonate (weight ratio about 1/1).

The copolymers and materials with ionic conduction of the present invention are useful for an electrochemical generator with alkali metal whether it is rechargeable or not. Such a generator comprises a negative electrode and a positive electrode which are separated by a solid polymer electrolyte, the solid polymer electrolyte comprising a copolymer according to the present invention. In such a generator, the electrodes may also contain an ionically conductive material of the present invention acting as a conductive binder, when they are prepared in composite form. In this particular application, the copolymers of the present invention are particularly interesting because they contain only a small number of species which can interfere with the electrochemical reactions. Indeed, the average high molecular weighs obtained substantially decrease the number of reactive ends, and the high polymerization yield limits the content of residual catalyst. In addition, the average high molecular weights that the copolymers may possess give to the copolymers and the ionically conductive materials in which the copolymers are present, an intrinsic mechanical behavior which is sufficient in the absence of cross-linking. However, if cross-linking is necessary, the statistical distribution of the cross-linkable units enables one to obtain a very homogeneous cross-linking.

The copolymers and the ionically conductive materials are also useful in other electrochemical systems such as in electrochrome systems, systems for modulating light, for the preparation of selective membranes or reference membranes in membrane pickups.

The present invention is illustrated by the following examples, it being understood that the invention is not limited to the examples given.

In the following examples, the polymerization was as carried out in stainless steel Parr® reactors having a 2L capacity, provided with a stirrer and a bottom valve enabling one to empty the reactor through the bottom. All the transfer operations were carried out under inert atmosphere by using very dry argon or nitrogen, and without oxygen.

In each example, the reactor was dried by washing it with an initiator solution and by removing this initiator solution before introducing the reagents into the reactor.

Ethylene oxide was distilled, the solvents and the other monomers used were dried on molecular sieves before introducing them into the reactor, in order to lower their water content to less than 100 ppm, which value is verified by the Karl-Fischer method.

BRIEF DESCRIPTION OF DRAWINGS

The invention is illustrated but not restricted by means of the following drawings in which.

EXAMPLES

Example 1

Figure 1:
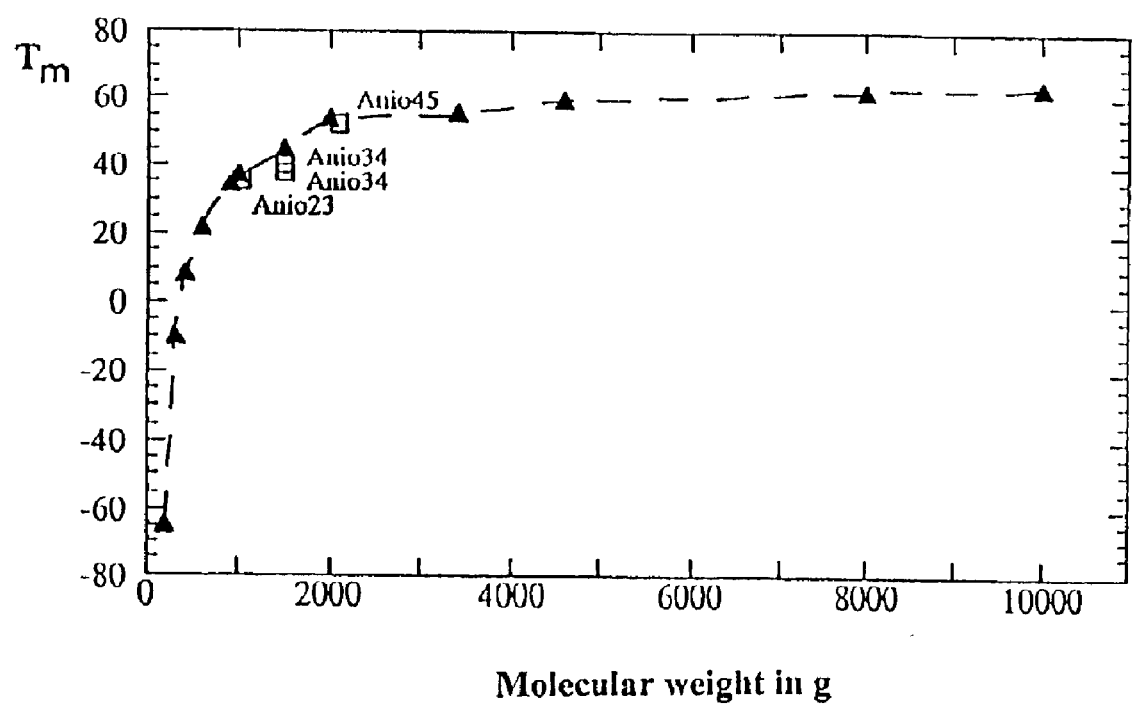
FIG. 1 is a curve of the variation of the melting temperature $T_m$ as a function of the average molecular weight for PEG, $Anio_{23}$, $Anio_{34}$ and $Anio_{45}$.

In a reactor which is free from traces of water and impurities, and which contains 250 ml of toluene, $10^{-3}$ mole of potassium tert-butanolate and 3 ml of THF, a mixture of 83.9 g of ethylene oxide, 10 g of methyl glycidyl ether and 5.1 g of allyl glycidyl ether was introduced. The temperature of the reactor was raised to 120° C. and maintained at that level for 22.5 hours. A decrease of the pressure from $10.3 \times 10^5$ Pa to $10^5$ Pa was observed. The temperature was thereafter lowered to 70° C. and 100 mg of a sulfide of 3-tert-butyl-4-hydroxy-5-methyl-phenyl commercialized by Aldrich, were added, this product being used as a stabilizing and anti-oxidizing agent for the polymer. The reactor was thereafter washed with a small quantity of toluene and 93 g of copolymer were recovered after evaporation of the solvent, which corresponds to a yield of 100%. A DSC analysis shows a melting peak Tm at 30° C. and a glass transition temperature Tg=−64° C. The weight average molecular weight, determined by steric exclusion chromatography (SEC), is about 105,000, with a polydispersity index of 1.7.

Example 2

In a reactor free from traces of water and impurities and containing 115 ml of toluene, $2.10^{-3}$ mole of potassium tert-butanolate and 6 ml of THF, a mixture of 87.2 g of ethylene oxide, 9.8 g of methyl glycidyl ether and 5 g of allyl glycidyl ether was introduced at room temperature. The temperature of the reactor was raised to 120° C. and maintained at that level for 22 hours. A decrease of the pressure from $10.3 \times 10^5$ to $1.4 \times 10^5$ Pa was noted. 100 mg of a sulfide of 3-tert-butyl-4-hydroxy-5-methyl-phenyl in solution in 50 ml of toluene were thereafter added. The copolymer was recovered after evaporation of the solvent with a yield of 85%, the essential portion of the losses being due to the fact that a small quantity of copolymer remains stuck on the wall of the reactor. A DSC analysis shows a melting peak Tm at 30° C. and a glass transition temperature Tg=−61° C. The weight average molecular weight, determined by steric exclusion chromatography (SEC), is about 80,000, with a polydispersity index of 1.9.

Example 3

In a reactor which is free from traces of water and impurities, 250 ml of toluene, $10^{-3}$ mole of potassium t-butanolate and 3 ml of THF were added. The temperature of the reactor was raised to 110° C. and, thereafter, a mixture of 90.2 g of ethylene oxide, 8.4 g of methyl glycidyl ether and 1.9 g of allyl glycidyl ether was added by means of a burette under pressure. The temperature of the reactor was raised to 120° C. and was kept at that level for 22 hours, during which a pressure decrease from $7.7 \times 10^{+5}$ to $2.6 \times 10^{+5}$ Pa was noted. The content of the reactor was thereafter poured into a glass flask containing 100 mg of 3-tert-butyl-4-hydroxy-5-methyl-phenyl sulfide under an argon atmosphere. 94.4 g of copolymer were recovered after evaporation of the solvent, which corresponds to a yield of 94%, not taking into account the copolymer which was not extracted from the reactor. A DSC analysis shows a melt peak Tm at 33° C. and a glass transition Tg=−59° C. The weight average molecular weight, determined by steric exclusion chromatography (SEC), was about 110,000, with a polydispersity of 2.2.

Example 4

A material prepared according to example 3 was used to produce a lithium battery operating at 60° C. with a composite $TiS_2$ cathode. The polymer electrolyte was prepared by dissolving the copolymer, 2% by weight of benzoyl peroxide and the salt lithium bis(trifluorosulfonyl)imide (TFSI) in acetonitrile in a ratio O/Li of 30/1. The solution was thereafter poured in the form of a film having a thickness of 25 μm and the film was dried under vacuum at 90° C. Similarly, the composite electrode was prepared on nickel by the solvent method utilizing close to 5% of Shawinigan black, some copolymer and $TiS_2$, so as to give a composite electrode whose capacity is 3 Cb per $cm^2$. The battery was mounted with a lithium anode 22 μm thick by consecutive pressing of the films under vacuum at 85° C., after which it was cycled at 60° C. The utilization was maintained at more than 85% during more than 150 cycles carried at a discharge rate of 6 hours (C/6) and at a charge rate (C/12) without any loss of utilization. This test confirms the electrochemical stability of the high molecular weight copolymers of the present invention.

Example 5

Into a reactor 100 ml of THF, 0.1 g of potassium-butanolate, 80 g of ethylene oxide (OE) and 9 g of allyl glycidyl ether were introduced (AGE), which corresponds to a OE/AGE ratio of 22. The reactor temperature was raised to 120° C. and was maintained at that level for 6 hours during which a pressure decrease from 7×10$^5$ Pa to 1.3×10$^5$ Pa was noted. At the end of the reaction, the reaction mixture was deactivated by introducing methanol into the reactor and some 3-tert-butyl-4-hydroxy-5-methyl-phenyl sulfide was added. 87 g of copolymer were recovered, hereinafter designated by Anio$_{22}$, corresponding to a nearly quantitative yield. The characteristics of the copolymer are the following: $M_w$=120,000 g; polydispersity index I=$M_w/M_m$=1.9; Tg=−62° C.; $T_m$=35.6° C.; rate of crystallinity x=0.37.

The crystallinity rate is measured in the following way: one measures by DSC the heat of fusion of the copolymer, and divides it by the heat of fusion of the same amount of pure PEO.

The average number of OE units between two AGE units in the copolymer Anio$_{22}$ was evaluated in the following manner, presuming that there is a regular distribution of the AGE units in the copolymer chain, namely 22 OE units between 2 AGE units. It was assumed that the melting temperature of a copolymer OE/AGE in which n OE units are found between 2 AGE units is substantially identical to the melting temperature of a polyethylene glycol (PEG) whose average molecular weight Mw is substantially identical to that of a sequence —(OE)—$_n$—, i.e. Mw=n×44. A determination was then made of the melting temperature of a number of PEG samples having different molecular weights and a curve $T_m$ is produced as a function of $M_w$. FIG. 1 represents the variation of the melting temperature $T_m$, expressed in ° C., as a function of the average molecular weight, expressed in grams, for a PEG (black triangles). It was noted that the melting temperature of the PEG increases very rapidly with the lengths of the chain to reach 65° C. for molar weights close to 8,000 g. In addition, according to this curve, the PEG whose melting temperature is close to 35° C. has an average molar mass of about 1,000 g, which corresponds to about 22 OE units.

Three similar evaluations were carried out with copolymers obtained by utilizing such quantities of monomers that the molar ratios OE/AGE are respectively 23, 34 and 45 (copolymers respectively designated Anio$_{23}$, Anio$_{34}$, and Anio$_{45}$). The melting temperature of each copolymer was determined and inserted on the curve of FIG. 1 (white squares). It was confirmed that the melting temperature of a copolymer Anio$_n$ is substantially identical to that of PEG having a molecular weight substantially equal to n×44. These tests thus confirm the regular distribution of the monomeric units in the copolymers OE/AGE obtained by the polymerization process according to the present invention.

Example 6

The copolymer Anio$_{22}$ of example 4 was cross-linked at 70° C. in the presence of 2 weight % of benzoyl peroxide with respect to the copolymer. The cross-linked network obtained has a melting temperature $T_m$=28° C., and a crystallinity rate=0.20.

Many electrolytes were prepared in the form of a film starting from the copolymer Anio$_{22}$. Solutions of copolymer Anio$_{22}$, lithium trifluorosulfonyl imide (TFSI) and benzoyl peroxide in acetonitrile, in which the TFSI content varies from one solution to the other, were prepared, and each solution was poured onto a support. After evaporation of the solvent, each film of copolymer obtained was cross-linked by heating, it was kept under vacuum during several days, and was preserved in a glove box. The conductivity was determined at different temperatures between 20° C. and 84° C.

Figure 2:
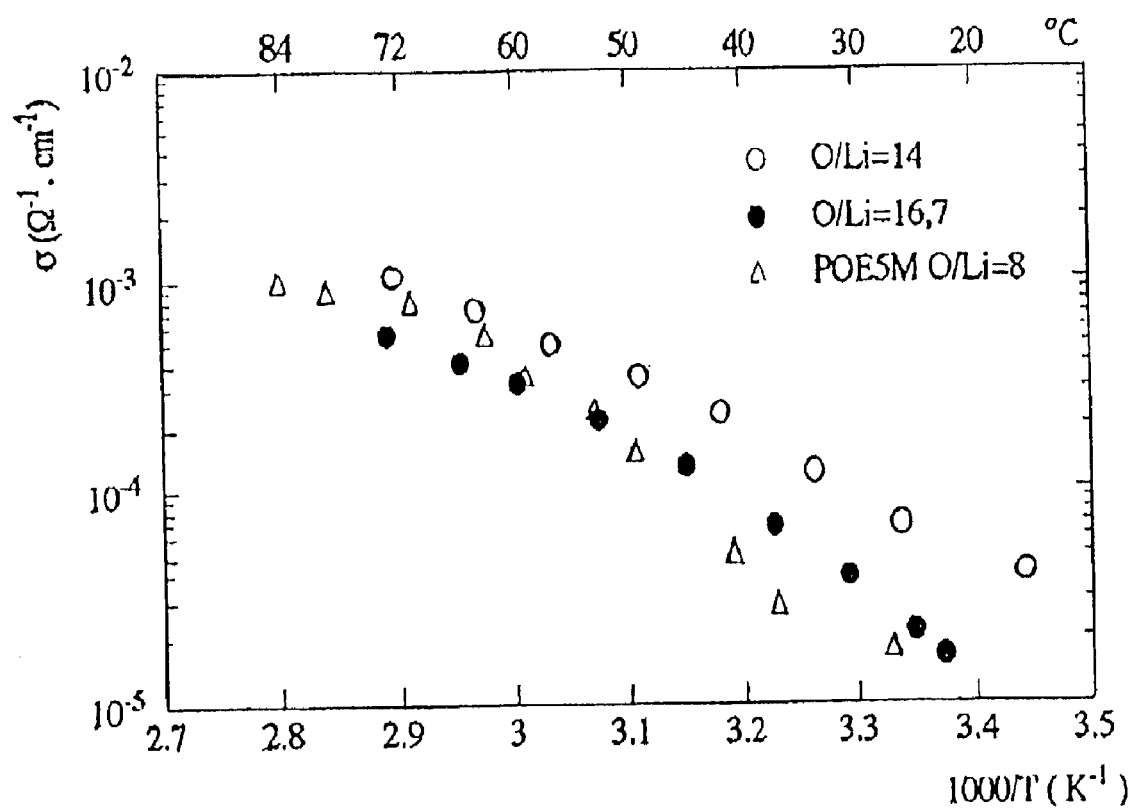
FIG. 2 represents the variation of the conductivity σ as a function of the temperature for different electrolytes.

FIG. 2 represents the variation of conductivity σ, expressed in $\Omega^{-1}cm^{-1}$, as a function of the temperature, expressed in ° C., for different electrolytes. The clear circles correspond to an electrolyte consisting of the copolymer Anio$_{22}$ and the salt TFSI in which the ratio O/Li=14; the black circles correspond to an electrolyte consisting of copolymer Anio$_{22}$ and TFSI in which the ratio O/Li=16.7; the clear triangles correspond to an electrolyte consisting of a poly(oxyethylene) whose molecular weight is 5×10$^6$ g/mole and in which the TFSI salt content is such that O/Li=8, usually considered as reference polymer having the best ionic conductivity.

The conductivities obtained for the electrolytes of the invention are, within the entire temperature range explored, higher than those noted for the reference complex poly (oxyethylene).

A DSC analysis has confirmed the completely amorphous character of the electrolytes.

The Table which follows shows glass transition temperature Tg (° C.) for different salt concentrations, indicated by the atomic ratio O/Li, and shows that the glass transition temperature of an electrolyte prepared from a copolymer according to the invention slowly decreases as the salt concentration increases.

| O/Li | Tg (° C.) |
|------|-----------|
| 8    | −33.6     |
| 9    | −34.6     |
| 13   | −38.6     |
| 16.7 | −46       |
| 22   | −49.2     |
| 27.5 | −51.2     |

The range of electrochemical stability of the electrolytes network Anio$_{22}$/LiTFSI was measured by cyclic voltametry on a platinum micro-electrode at 81° C. The volt-amperograms obtained show the lithium deposit, in the form of a sharp peak at about OV vs lithium. A return sweep shows the reoxidation of the alloys and the intermetallic compounds, formed between platinum and lithium. No peak resulting from the oxidation or the reduction of the copolymer was noted in the power range explored, namely from 0 to +3.9 V vs Li/Li+.

A thermogravimetric analysis shows that the electrolytes are stable up to 240° C., which is amply sufficient when they are used in all solid lithium batteries, since melting of lithium takes place already at 180° C.

Example 7

150 ml of THF, 0.12 g of potassium t-butanolate, 89 g of ethylene oxide (OE), 9.8 g of epoxyhexene and 8.4 g of an epoxide $CH_2$—$CHR'$—O in which R' represents a group $CH_2$—O—$CF_2$—$CF_2$—$SO_3$—K were added to a reactor. The temperature of the reactor was raised to 110° C. and maintained at that level for 12 hours. Then, the reaction mixture was deactivated by introducing methanol into the reactor and a precipitate was formed in hexane, which gave 103 g of a polymer having ionophoric functions. The yield is near 96%.

An analysis by steric exclusion chromatography (SEC), on two columns of nominal steric exclusion 10 nm size of a solution obtained by dissolving the precipitate in THF showed no residues of the ionic monomer $CH_2=CHR'—O$ which would not have reacted.

A cross-linked membrane was produced by adding 1% by weight (with respect to the polymer) of benzoyl peroxide to a solution of the copolymer in a solvent and by heating at 80° C. during two hours. The conductivity of the membrane obtained is $10^{-5}$ S.cm$^{-1}$ at 37° C. and $10^{-4}$ S.cm$^{-1}$ at 77° C.

A DSC analysis shows a melting point of 24° C. and a glass transition temperature of −55° C.

A sample of the cross-linked membrane was swelled three times with a solution of $(CF_3SO_2)_2NLi$ in acetonitrile, in order to exchange the cations K$^+$ with cations Li$^+$. The membrane was thereafter put on a filtrating crucible and the solution of acetonitrile was removed by filtration. The membrane was then washed three times in 50 ml of acetonitrile in order to remove any trace of free salt, and this was followed by careful drying. Its conductivity was then $10^{-5}$ S.cm$^{-1}$ at 45° C. and $10^{-4}$ S.cm$^{-1}$ at 95° C. Its melting temperature was 25° C. and its glass transition temperature was −57° C.

Example 8

An ionically conductive unipolar electrolyte was prepared by co-cross-linking the copolymer Anio$_{22}$ prepared according to example 4 with an ionophoric compound carrying a double bond of the allyl type, $CH_2=CH—CH_2—O—CF_2—CF_2—SO_3Li$. Cross-linking was carried out with 2% by weight of benzoyl peroxide at 70° C. for 3 hours. The quantity of ionophoric compound added corresponds to a ratio O/Li of 15. An analysis of the solvents after washing the cross-linked membrane shows that about 90% of the salt was incorporated into the network. In the network, the ratio O/Li is therefore 17.

A DSC analysis shows a melting peak at 19° C. and a glass transition temperature of −58° C.

The electrolyte reaches a conductivity of $10^{-5}$ S.cm$^{-1}$ at 33° C. and $10^{-4}$ S.cm$^{-1}$ at 70° C.

The membrane was thereafter swelled by incorporating 30% by weight of a mixture in a 2/1 molar proportion of propylene carbonate and ethylene carbonate. The conductivity then reached $5.10^{-5}$ S.cm$^{-1}$ at 20° C. and $10^{-3}$ S.cm$^{-1}$ at 60° C.

We claim:

1. A process for the preparation of a copolymer in a stainless steel reactor; said copolymer having a chain comprising ethylene oxide, $—O—CH_2—CHR$ units, in which R is a substituent having a reactive function cross-linkable by free radical process, and optionally, $—O—CH_2—CHR'$ units, in which R' is a substituent having no reactive function cross-linkable by free radical process; said copolymer having a polydispersity index (I)=Mw/Mn lower than or equal to 2.2, a number average molecular weight Mn greater than or equal to 20,000 and a random distribution of monomer units; said process comprising the steps of:

drying said stainless steel reactor by washing it with a solution containing an initiator and removing said initiator before the introduction of the reagents in order to remove impurities therefrom;

distilling said ethylene oxide, and drying an aprotic solvent and the monomer units on molecular sieves in order to lower their water content to less than 100 ppm; and reacting said ethylene oxide and said monomer units in said stainless steel reactor in said aprotic solvent in the presence of an anionic polymerization initiator to yield said copolymer.

2. The process according to claim 1, wherein the polymerization initiator is at least one selected from the group consisting of alkali metals in metallic form, in the form of alcoholates and in the form of complexes thereof.

3. The process according to claim 2, wherein the alkali metal is at least one selected from the group consisting of cesium and potassium.

4. The process according to claim 1, wherein R represents a radical comprising an unsaturated carbon-carbon bond.

5. The process according to claim 4 wherein R represents a radical having the formula $CH_2=CH—(CH_2)_q—(O—CH_2)_p$ in which $1 \leq q \leq 6$ and p=0 or 1, or $CH_3—(CH_2)_y—CH=CH—(CH_2)_x—(OCH_2)_p$ in which $0 \leq x+y \leq 5$ an p=0 or 1.

6. The process according to claim 4, wherein the $CH_2—CHR—O$ is at least one selected from the group consisting of allyl glycidyl ether and epoxyhexene.

7. The process according to claim 1, wherein R$^1$ is at least one selected from the group consisting of alkyl radicals; alkoxy radicals; alkyl(perfluoroalkyl sulfonate)ethers radicals; radicals including a ionophoric function in which the negative charge is carried by the bis(trifluoromethyl sulfonyl methylide carbanion $—C(SO_2CF_3)_2M''$, wherein M" represents a metallic cation.

8. The process according to claim 7, wherein R' represents alkyl radicals having 1 to 16 carbon atoms, $(CH_2)_n—O—((CH_2)_m—O)_p—CH_3$, in which $0 \leq n \leq 4$, $1 \leq m \leq 4$ and $0 \leq p \leq 20$.

9. The process according to claim 1, further comprising the step of deactivating terminal functions (OH) of the copolymer at the end of the reaction.

10. The process according to claim 9, wherein the deactivation is carried out by introducing methanol, methyl iodide or methyl sulfate into the reactor.

11. The process according to claim 9, wherein the deactivation is carried out by introducing 2-bromo-1-cyanoethane into the reactor.

12. The process according to claim 1, further comprising the step of adding an anti-oxidizing agent into the reactor at the end of the reaction.

* * * * *